United States Patent
Brühl et al.

(10) Patent No.: US 9,352,648 B2
(45) Date of Patent: May 31, 2016

(54) METHOD AND SYSTEM FOR OPERATING A DRIVETRAIN OF A MOTOR VEHICLE

(71) Applicant: AUDI AG, Ingolstaddt (DE)

(72) Inventors: Hans Jörg Brühl, Kösching (DE); Dieter Weidemann, Stammham (DE); Heiko Hanickel, Ingolstadt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 14/436,375

(22) PCT Filed: Oct. 18, 2013

(86) PCT No.: PCT/EP2013/003142
§ 371 (c)(1),
(2) Date: Apr. 16, 2015

(87) PCT Pub. No.: WO2014/063799
PCT Pub. Date: May 1, 2014

(65) Prior Publication Data
US 2015/0239345 A1    Aug. 27, 2015

(30) Foreign Application Priority Data
Oct. 24, 2012   (DE) .................. 10 2012 020 908

(51) Int. Cl.
*B60K 23/08* (2006.01)
*B60W 10/02* (2006.01)

(52) U.S. Cl.
CPC ............ *B60K 23/08* (2013.01); *B60W 10/02* (2013.01); *B60K 2023/085* (2013.01); *B60K 2023/0858* (2013.01); *F16D 2500/5075* (2013.01)

(58) Field of Classification Search
CPC ............ B60K 23/08; B60K 2023/085; B60K 2023/0858; B60W 10/02; F16D 2500/5075
USPC ........................................................... 701/69
See application file for complete search history.

(56) References Cited

U.S. PATENT DOCUMENTS

| 7,325,640 | B2* | 2/2008 | Ushiroda | B60K 23/0808 180/248 |
| 9,114,795 | B2* | 8/2015 | Matsuno | B60K 17/3462 |

(Continued)

FOREIGN PATENT DOCUMENTS

| DE | 2009 005 378 | 4/2010 |
| DE | 2010 046 235 | 3/2012 |

(Continued)

OTHER PUBLICATIONS

International Search Report issued by the European Patent Office in International Application PCT/EP2013/003142.

*Primary Examiner* — Roger Pang
(74) *Attorney, Agent, or Firm* — Henry M. Feiereisen LLC

(57) ABSTRACT

The invention relates to a method for operating a drivetrain (10) of a motor vehicle, having the steps: detecting at least one variable which quantifies and/or influences a movement of the motor vehicle; activating an all-wheel drive system of the motor vehicle as a function of the variable; wherein it is estimated, on the basis of the at least one variable, whether a relevant driving situation is impending, and in this case only, the all-wheel drive system is activated before the onset of the relevant situation. The invention also relates to a system for operating a drivetrain (10) of a motor vehicle.

8 Claims, 1 Drawing Sheet

(56) References Cited

U.S. PATENT DOCUMENTS

| | | |
|---|---|---|
| 2010/0274456 A1 | 10/2010 | Kondo et al. |
| 2011/0082004 A1 | 4/2011 | Kato et al. |
| 2012/0021864 A1 | 1/2012 | Ziech et al. |
| 2013/0260959 A1 | 10/2013 | Quehenberger et al. |
| 2013/0296131 A1 | 11/2013 | Mueller et al. |
| 2015/0096814 A1* | 4/2015 | Maeda ............ B60K 23/08 180/6.28 |
| 2015/0111696 A1* | 4/2015 | Maeda ............ B60K 23/08 477/79 |
| 2015/0175148 A1* | 6/2015 | Chimner ............ B60W 50/082 701/69 |
| 2015/0328983 A1* | 11/2015 | Takaira ............ B60K 23/08 180/233 |

FOREIGN PATENT DOCUMENTS

| | | |
|---|---|---|
| EP | 0 241 382 | 10/1987 |
| EP | 2 243 653 | 10/2010 |
| EP | 2 308 711 | 4/2012 |
| GB | 2488155 | 8/2012 |
| GB | 2488410 | 8/2012 |

\* cited by examiner

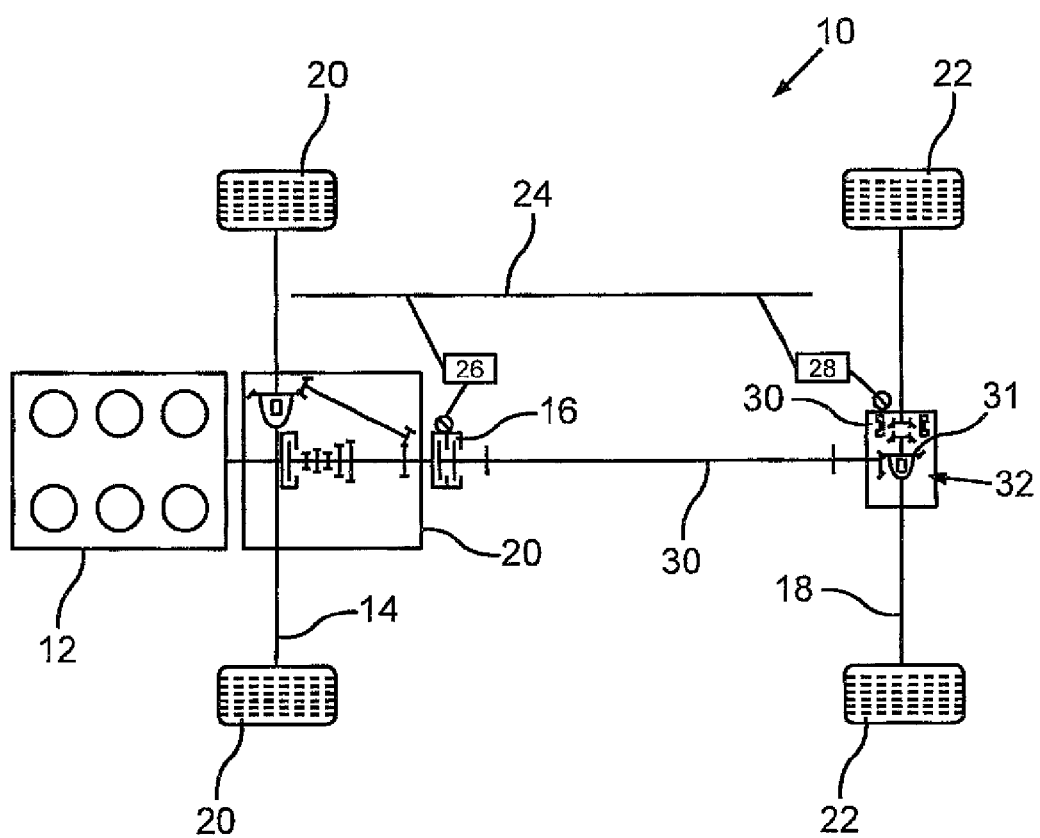

METHOD AND SYSTEM FOR OPERATING A DRIVETRAIN OF A MOTOR VEHICLE

CROSS-REFERENCES TO RELATED APPLICATIONS

This application is the U.S. National Stage of International Application No. PCT/EP2013/003142, filed Oct. 18, 2013, which designated the United States and has been published as International Publication No. WO 2014/063799 and which claims the priority of German Patent Application, Serial No. 10 2012 020 908.8, filed Oct. 24, 2012, pursuant to 35 U.S.C. 119(a)-(d).

BACKGROUND OF THE INVENTION

The invention relates to a method for operating a drivetrain of a motor vehicle. Furthermore, the invention relates to a system for operating a drivetrain of a motor vehicle.

A generic method for operating a drivetrain of a motor vehicle is known from DE 10 2009 005 378 A1. At least one variable, which quantifies and/or influences a movement of the motor vehicle is ascertained, and an all-wheel drive of the motor vehicle is activated as a function of the variable. In particular, a sensor is provided for detecting a wheel slip on a continuously driven primary axle, with the all-wheel drive and a secondary axle being activated in response to a detected wheel slip on the primary axle.

EP 2 308 711 B1, EP 2 243 653 A2, US 20 120 021 864 A1 and DE 10 2010 046 235 A1 respectively show a drivetrain of a motor vehicle which has an activatable all-wheel drive. Common to the disclosed drivetrains is the provision of a clutch on an activatable secondary axle to allow separation of an axle drive, provided on the secondary axle powered in all-wheel drive, from a power flow between the wheels arranged on the secondary axle.

EP 0 241 382 B1 shows a rear axle for a motor vehicle with a clutch by which an axle drive, provided on the rear axle, can be separated from a power flow between the two rear wheels.

SUMMARY OF THE INVENTION

It is the object of the present invention to provide a method and system for operating a drivetrain of a motor vehicle of the afore-mentioned type, by means of which an all-wheel drive of a motor vehicle can be activated in an improved manner.

This object is achieved by a method and a system for operating a drivetrain of a motor vehicle having the features of the independent claims. Advantageous configurations with useful and non-trivial refinements of the invention are set forth in the dependent claims.

In a method according to the invention for operating a drivetrain of a motor vehicle, at least one variable, which quantifies and/or influences a movement of the motor vehicle, is ascertained and an all-wheel drive of the motor vehicle is activated as a function of the variable, wherein the method of the invention is characterized in that based on the at least one variable, it is assessed, whether a relevant driving situation is imminent, and in this case only is the all-wheel drive activated before onset of the relevant situation. In other words, the variable to quantify and/or influence a movement of the motor vehicle is used to monitor whether a relevant driving situation can be expected, wherein in this case only the all-wheel drive is activated in time, before the relevant situation can occur. A relevant situation is to be understood, for example, as the occurrence of a wheel slip on the permanently powered primary axle, an understeer or oversteer, and the like. This list of examples is not to be understood as exhaustive.

In general, a relevant driving situation involves driving situations in which a deviation between an actual responsiveness of the motor vehicle and a responsiveness dictated or desired by a driver can be expected, wherein in the extreme case, a threshold of the motor vehicle is exceeded so that a driver may be expected to lose control of the motor vehicle. Moreover, a relevant driving situation also involves any situation in which the driver is able to resolve different handling characteristics between single-axle operation and all-wheel operation. This involves not only driving situations that are relevant in terms of driving safety but also driving dynamics and comfort.

It is provided according to the invention to activate the all-wheel drive of the motor vehicle, i.e. the still idle secondary axle of the motor vehicle, even before the onset of a relevant driving situation, so that activation of the all-wheel drive is able to realize an additional improvement of the driving dynamics of the motor vehicle, even before the onset of the actually relevant driving situation. A driving situation which can still be viewed as relevant in a pure two-wheel drive can thus become through activation of the all-wheel drive a no longer relevant driving situation, because the additionally powered wheels of the secondary axle can result in an improved driving dynamics of the motor vehicle. In particular, the all-wheel drive of the motor vehicle is activated in time to allow, before intervention of driving dynamics control systems, for example an electronic stability control, a traction control and the like, improvement of the handling of the motor vehicle such that, possibly, no intervention at all or a significantly lesser intervention of a driving dynamics control is required. As a result of the proactive activation of the all-wheel drive of the motor vehicle, handling of the motor vehicle can, optionally, be improved with correspondingly greater safety reserves. At the same time, the fact that the all-wheel drive is activated only when indeed needed, fuel consumption can be reduced.

According to an advantageous configuration of the invention, provision is made, after the all-wheel drive has been activated, to determine on the basis of the at least one variable and/or other variables that quantify and/or influence the movement of the motor vehicle, whether a deactivation of the all-wheel drive would lead to a relevant driving situation, and if this is not the case, to deactivate the all-wheel drive after a defined holding time. Preferably, it is virtually permanently (for example, up to 150 times per second) checked whether a complete deactivation of the all-wheel drive, i.e. a pure two-wheel drive, i.e. a sole powering of the permanently driven primary axle, would lead to a relevant driving situation. Should this not be the case, the all-wheel drive is deactivated again after the defined holding time, so that a highly energy-efficient operation of the motor vehicle is rendered possible through appropriate use of the all-wheel drive.

According to a further advantageous embodiment of the invention, an axle drive, provided on a secondary axle powered only during all-wheel operation; is separated from a power flow between two wheels, when the all-wheel drive is deactivated. As a result, friction losses due to entrainment of the ring gear and the cardan shaft can be significantly reduced, with only differential gears of an axle differential required to be entrained. In a situation, when it is only the primary axle that is powered, considerable energy savings during operation of the motor vehicle can be realized as a result of the reduced friction losses.

According to a further advantageous embodiment of the invention, provision is made for a comparison of at least one variable, which quantifies and/or influences the movement of the motor vehicle, with a predefined threshold value, when assessing whether a relevant driving situation is imminent. In this way, a decision can especially easily be made whether or not a relevant driving situation can be expected. In particular, the threshold value is set so that, when reaching or exceeding the threshold value, driving behavior between the single-axle operation and all-wheel operation is so different that the driver is able to address this, i.e. it would be perceptible. Preferably, several threshold values can be respectively predefined for several variables which quantify and/or influence the movement of the motor vehicle so that a driver would encounter a different driving behavior between the single-axle operation and all-wheel operation, when reaching or exceeding the threshold values.

According to an advantageous embodiment of the invention, provision is made for predefining different values for the threshold value and/or the holding time in dependence on a respectively activated mode of operation of the drivetrain. The modes of operation may, for example, involve a mode of operation in which the motor vehicle should be operated particularly energy-efficient, a mode of operation in which the motor vehicle should travel especially dynamic, a mode of operation in which the motor vehicle should travel especially comfortably, and the like. Depending on the selected mode of operation of the drivetrain, different threshold values and/or holding times are thus predefined, so that activation and deactivation of the all-wheel drive can be used to best meet the relevant specifications of the respective modes of operation.

According to a further advantageous embodiment of the invention, provision is made for automatic activation of the respective modes of operation of the drivetrain as a function of at least one further currently activated mode of operation of the motor vehicle. For example, a sports program in an automatic transmission of the motor vehicle may have been selected, so that the correspondingly matching dynamic mode of operation of the drivetrain is automatically set to thereby enable adaptation of the transmission control and the control of the drivetrain to one another. Furthermore, it is also conceivable to predefine different modes of operation for the entire motor vehicle, with respective modes of operation of the drivetrain being automatically selected by taking into account the selection of the higher-level mode of operation of the motor vehicle.

According to a further advantageous configuration of the invention, provision is made for activation of the respective modes of operation of the drivetrain at least during a selectable automatic mode of the drivetrain as a function of the way as to how the motor vehicle is operated by the driver. This results in an automatic adaptation of the respective threshold values for the activation and deactivation of the all-wheel drive depending upon how a respective driver moves the motor vehicle. For example, different user profiles can be created and continuously refined for different drivers of the motor vehicle so that the all-wheel drive can be activated and deactivated driver-dependent in an especially effective manner in the automatic mode.

According to a further advantageous embodiment of the invention, provision is made for predefining different threshold values for the activation and deactivation of the all-wheel drive for the different modes of operation. The difference between the respective threshold values, with which a particular variable that quantifies and/or influences the movement, is to be compared, is hereby selected of a size sufficient to prevent a continuous or permanent back-and-forth switching between the all-wheel drive and two-wheel drive.

According to further advantageous embodiment of the invention, respective single-wheel speeds, a steering wheel motion, a steering wheel angle gradient, an accelerator pedal value, an accelerator pedal value gradient, a brake pedal value, a transversal acceleration of the motor vehicle, a yaw rate of the motor vehicle, a longitudinal acceleration of the motor vehicle and/or an actual gear ratio of the motor vehicle are determined as a variable that quantifies and/or influences the movement of the motor vehicle. Different individual threshold values that are dependent on the mode of operation can be predefined for the above-mentioned variables. In addition or as an alternative, it is however also possible to combine with each other or offset against one another the various variables, with different threshold values for each mode of operation being predefined for these computed variables. By ascertaining the mentioned variables, for example, in a combination with an appropriately stored vehicle model, friction coefficients of the roadway, oversteer and/or understeer, respective wheel slip of the motor vehicle, wheel torques, torques transmitted from the tires onto the roadway, and the like, can be calculated in anticipation.

A system according to the invention for operating a drivetrain of a motor vehicle includes a detection device configured to ascertain at least one variable which quantifies and/or influence a movement of the motor vehicle, a control device configured to activate an all-wheel drive of the motor vehicle as a function of the variable, with the system according to the invention being characterized in that the control device is configured to assess, based on the at least one variable, whether a relevant driving situation is imminent, and to activate in this case only the all-wheel drive before onset of the relevant situation. Advantageous configurations of the method according to the invention are to be regarded as advantageous configurations of the system, with the system including here in particular means by which the method steps can be executed.

Further advantages, features and details of the invention will become apparent from the following description of a preferred exemplary embodiment and the drawing. The features and feature combinations, as mentioned above in the description as well as the features and feature combinations described hereinafter in the figure description and/or shown individually in the figures can be used not only in the respectively specified combination but also in other combinations or when taken alone, without departing from the scope of the invention. Thus, also configurations of the invention are to be understood as being covered and disclosed, which are not explicitly shown and explained in the figures, however, become apparent and can be arrived at by separating feature combinations from the described embodiments.

BRIEF DESCRIPTION OF THE DRAWING

Exemplary embodiments of the invention are described in greater detail hereinafter with reference to the single FIGURE in which a drivetrain of a motor vehicle is shown.

DETAILED DESCRIPTION OF PREFERRED EMBODIMENTS.

A drivetrain 10 of an unlabeled motor vehicle includes a primary axle 14 which is powered by a longitudinally mounted engine 12, and a secondary axle 18 which can be activated via a first clutch 16. Through intervention of a transmission 20, the power generated by the engine 12 or the geared torque is transmitted to the primary axle 14 and thus also to the front wheels 20. The drivetrain 10 may also include a transversely mounted engine 12. In addition, it is possible, as shown here, to use a front engine but also a rear engine. Depending on the installation position of the engine 12, the remaining components of the drivetrain 10 are suited to establish an all-wheel drive that can be activated or deactivated.

The first clutch 16, which may involve a disk clutch in the present case, enables a variable distribution of the torque provided by the engine 12 or the supplied power between the permanently powered primary axle 14 and the activatable secondary axle 18 so that rear wheels 22 arranged on the secondary axle 18 can also be powered.

The present drivetrain 10 is configured for operation as typical pure front-wheel drive, with an all-wheel drive being activated only when required, i.e., the addition of the secondary axle 18. As an alternative, the drivetrain 10 may also be configured as rear-wheel drive with activatable front-wheel drive. During the two-wheel drive of the motor vehicle, a detection device, not shown here, acquires continuously variables which quantify and/or influence a movement of the motor vehicle and are provided, for example, by a CAN-bus system, a FlexRay system or a comparable communication system 24.

The variables which quantify and/or influence the movement of the motor vehicle may involve, for example, respective single-wheel speeds, a steering wheel angle, a steering wheel angle gradient, an accelerator pedal value, an accelerator pedal value gradient, a brake pedal value, a transversal acceleration of the motor vehicle, a yaw rate of the motor vehicle, a longitudinal acceleration of the motor vehicle and/or an actual gear ratio of the motor vehicle.

In the present case, two control devices 26, 28 are provided which are configured to activate an all-wheel drive of the motor vehicle, i.e., the secondary axle 18, as a function of the ascertained variables. Based on the permanently ascertained variables, the control devices 26, 28 assess whether a relevant driving situation is imminent, and in this case only, do the control devices 26, 28 activate the all-wheel drive before onset of the relevant situation.

The control device 26 is configured to control the first clutch 16 by which the torque distribution between the primary axle 14 and the secondary axle 18 is controlled. The control device 28 assumes the control of a second clutch 30 by which an axle drive 32 can be separated from a power flow between the two rear wheels 22.

Using the permanently ascertained variables, for example a slip detection, friction loss estimation, a wheel torque calculation, oversteer and understeer detection, for example, with the assistance of an available vehicle model, can be implemented, so that relevant driving situations can be predicted by taking into account the ascertained variables. For example, ascertaining a wheel angle gradient, i.e. the speed at which steering motion occurs, in combination with the detection of the accelerator pedal value gradient, i.e. how fast an accelerator pedal is depressed, enables determination whether, for example, a relevant driving situation of the motor vehicle can be expected, when a pure front-wheel drive is involved. In the event such a relevant situation can be predicted, the two clutches 16, 30, are actuated by the control devices 26, 28, respectively, to trigger an all-wheel operation of the motor vehicle, i.e. to power the secondary axle 18 and thus also the rear wheels 22.

To be able to activate the all-wheel drive, the all-wheel clutch 16 is first engaged in order to bring the initially stationary components to target rotation speed. Then, the clutch 30 is engaged to allow the power flow to the secondary axle 18. Depending on the activation conditions, different holding times for all-wheel operation are stored so as to reduce the frequency of the activation and deactivation.

After the all-wheel drive has been activated, the variables that quantify and/or influence the movement of the motor vehicle are continued to be permanently monitored, and it is determined whether a deactivation of the all-wheel drive or a complete shutdown of the drive of the secondary axle 18 would lead to a relevant driving situation. Should this not be the case because, for example, the motor vehicle travels straight ahead or negotiates a curve at correspondingly moderate speed, the all-wheel drive is deactivated again.

To deactivate the all-wheel drive, the control device 26 disengages the clutch 16, so that the power and the provided torque of the engine 12 are transmitted solely to the primary axle 14. Subsequently, the control device 28 disengages also the second clutch 30, so that the axle drive 32 is separated from the power flow between the two rear wheels 22. The second clutch 30 involves, for example, a dog clutch, which is provided on an unspecified output flange shaft of the axle drive 32, so that the power flow between the axle drive and one of the wheels 22 and thus between the two wheels 22 can be interrupted.

As soon as both clutches 16, 30 have been disengaged, respective components between the clutches 16, 30 come to a halt. As a result, the axle drive 32 is separated from the engine 12 so that respective friction losses due to transmission of torque to the secondary axle 18 are reduced, on one hand. Furthermore, the friction losses due to entrainment of a ring gear 34 and a cardan shaft 36 are significantly reduced. Solely unspecified differential gears of an also unspecified rear axle differential are entrained. However, the resultant friction losses are tolerable. The financial and structural complexity, which would be necessary for a complete decoupling of the rear axle and the rear-axle differential, would not be proportionate to the achievable energy savings.

In order to be able to properly combine the actuation of the two clutches 16, 30 with one another, an operating strategy is used which provides the driver, in addition to an automatically executed control, also to a certain extent the option to influence the control. In addition to an automatic mode of the drivetrain, in which the activation and deactivation of the all-wheel drive is executed fully automatically, further modes of operation can be provided. For example, an efficiency mode can be provided, in which the activation and deactivation of the all-wheel drive is implemented in such a way that the motor vehicle can be operated very energy-efficient. Furthermore, a so-called dynamic mode can be provided in which a particularly dynamic motion of the motor vehicle is provided so that the activation and deactivation of the all-wheel drive is implemented such as to promote a particularly dynamic and thereby also safe movement of the motor vehicle. Moreover, also a comfort mode may, for example, be provided in which the activation and deactivation of the all-wheel drive is used in particular to improve comfort, when operating the motor vehicle.

In general, threshold values are respectively predefined for the various permanently ascertained variables, which quantify the movement of the motor vehicle and/or influence the movement thereof, for continuous comparison with the ascertained variables. Depending on the mode of operation, different values for the threshold values and holding times are hereby respectively predefined, with different threshold values and holding times also being predefined for the activation and deactivation of the all-wheel drive for the various modes of operation so as to prevent a continual activation and deactivation of the all-wheel drive.

When a driver has selected, for example, the efficiency mode, there is a slight pre-control of the all-wheel drive. This means that the all-wheel drive is activated relatively late and again deactivated relatively early, so that the presence of all-wheel phases is as slight as possible and therefore also the presence of all-wheel times is as brief as possible. This promotes an especially energy-efficient movement of the motor vehicle.

When the motor vehicle operates, however, in dynamic mode, pre-control of the all-wheel drive is especially significant. This means that a particularly early activation of the all-wheel drive is implemented, accompanied overall with also longer all-wheel phases. For example, it can be provided in the dynamic mode that, for a slow ride, for example, from start-up to a speed of 30 km/h, an all-wheel drive is provided throughout, because of the expectation in the dynamic mode of especially high accelerations by a driver, so that at any time a best possible traction is enabled as a result of the activated all-wheel drive.

When the motor vehicle operates, however, in a comfort mode, pre-control is implemented in such situations in which an all-wheel drive has a positive influence on comfort, for example in terms of a steering influence during transversal accelerations, a stable driving, when accelerating, and the like. In the comfort mode, the all-wheel drive is also deactivated again as early as possible.

In the event, the automatic mode of the drivetrain 10 is pre-selected, the appropriate mode of operation is automatically selected, i.e. for example, between the efficiency mode, the dynamic mode, and the comfort mode, depending on a detected type of driver, actually recognized driving situations, and anticipated driving conditions. The respective modes of operation of the drivetrain can also be automatically activated in response to further currently activated modes of operation of the motor vehicle. For example, the motor vehicle may be equipped with an automatic transmission that in turn affords a driver the option to select between comfort, sport, and the like. The modes of operation of the drivetrain are hereby suited to one another in dependence on the selected mode of operation of the automatic transmission.

Furthermore, it is also conceivable that the motor vehicle has an adjustable chassis which can be set, for example, between a comfort mode and a sports mode. In such a case, the mode of operation of the drivetrain can also be adjusted in coordination with the selected mode of operation of the chassis. In general, it can therefore be provided that the modes of operation of the drivetrain can be matched with further preset or automatically adjustable modes of operation of most different components of the motor vehicle, e.g. an ESP mode.

Overall, the early activation of the all-wheel drive provides a correspondingly high safety margin so that the handling of the motor vehicle can be improved in due time before onset of a relevant driving situation that could occur during a drive of a single axle 14. Further, monitoring and evaluating the variables, which quantify and/or influence the movement of the motor vehicle, enables an assessment in what way an activated all-wheel drive can be deactivated again, so that the motor vehicle can be operated as energy-efficient as possible.

What is claimed is:

1. A method for operating a drivetrain of a motor vehicle, comprising the steps of:
    ascertaining at least one variable, which quantifies and/or influences a movement of the motor vehicle, by determining respective single-wheel speeds, a steering wheel motion, a steering wheel angle gradient, an accelerator pedal value, an accelerator pedal value gradient, a brake pedal value, a transversal acceleration of the motor vehicle, a yaw rate of the motor vehicle, a longitudinal acceleration of the motor vehicle and/or an actual gear ratio of the motor vehicle are determined;
    activating an all-wheel drive of the motor vehicle as a function of the variable;
    based on the at least one variable, assessing whether a relevant driving situation is imminent; and, only if affirmative, activating the all-wheel drive activated before onset of the relevant situation, wherein said relevant driving situation involves a driving situation in which a deviation between an actual responsiveness of the motor vehicle and a responsiveness dictated by a driver can be expected, or a driving situation in which the driver is able to resolve different handling characteristics between single-axle operation and all-wheel operation; and
    once the all-wheel drive has been activated, determining on the basis of the at least one variable and/or further variables, which quantify and/or influence the movement of the motor vehicle, whether a deactivation of the all-wheel drive would lead to said relevant driving situation, and if this is not the case, deactivating the all-wheel drive after a defined holding time.

2. The method of claim 1, further comprising separating an axle drive, provided on a secondary axle powered only in all-wheel operation, from a power flow between two wheels, as the all-wheel drive is deactivated.

3. The method of claim 1, further comprising comparing the at least one variable with a predefined threshold value for assessment as to whether said relevant driving situation is imminent.

4. The method of claim 3, further comprising predefining different values for the threshold value and/or the holding time in dependence on a respectively activated mode of operation of the drivetrain.

5. The method of claim 4, further comprising automatically activating the mode of operation of the drivetrain in response to at least one other currently activated mode of operation of the motor vehicle.

6. The method of claim 4, further comprising activating the mode of operation of the drivetrain at least during a selectable automatic mode in dependence on a manner how the motor vehicle is moved by the driver.

7. The method of claim 4, further comprising predefining for the activation and deactivation of the all-wheel drive different threshold values and/or holding times for different modes of operation.

8. A system for operating a drivetrain of a motor vehicle, comprising:
    a detection device configured to ascertain at least one variable which quantifies and/or influences a movement of the motor vehicle, wherein respective single-wheel speeds, a steering wheel motion, a steering wheel angle gradient, an accelerator pedal value, an accelerator pedal value gradient, a brake pedal value, a transversal acceleration of the motor vehicle, a yaw rate of the motor vehicle, a longitudinal acceleration of the motor vehicle and/or an actual gear ratio of the motor vehicle are determined as the variable that quantifies and/or influences the movement of the motor vehicle; and
    a control device configured
        to activate an all-wheel drive of the motor vehicle as a function of the variable,
        to assess, based on the at least one variable, whether a relevant driving situation is imminent, and to activate only in this case the all-wheel drive before onset of the relevant situation, wherein said relevant driving situation involves a driving situation in which a deviation between an actual responsiveness of the motor vehicle and a responsiveness dictated by a driver can be expected, or a driving situation in which the driver is able to resolve different handling characteristics between single-axle operation and all-wheel operation, to determine, once the all-wheel drive has been activated, on the basis of the at least one variable and/or further variables, which quantify and influence the movement of the motor vehicle, whether a deactivation of the all-wheel drive would lead to said relevant driving situation, and if this is not the case, to deactivate the all-wheel drive after a defined holding time.

* * * * *